United States Patent
Palm et al.

(10) Patent No.: US 11,611,889 B2
(45) Date of Patent: Mar. 21, 2023

(54) AUTOMATIC TRANSMISSION POINT HANDLING IN A WIRELESS COMMUNICATION NETWORK

(71) Applicant: Telefonaktiebolaget LM Ericsson (publ), Stockholm (SE)

(72) Inventors: Niclas Palm, Svedala (SE); Emil Pettersson, Helsingborg (SE); Jan Wichert, Lund (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 250 days.

(21) Appl. No.: 16/762,986

(22) PCT Filed: Dec. 6, 2017

(86) PCT No.: PCT/SE2017/051228
§ 371 (c)(1),
(2) Date: May 11, 2020

(87) PCT Pub. No.: WO2019/112498
PCT Pub. Date: Jun. 13, 2019

(65) Prior Publication Data
US 2020/0275290 A1   Aug. 27, 2020

(51) Int. Cl.
*H04W 24/02* (2009.01)
*H04B 7/024* (2017.01)
*H04W 24/08* (2009.01)

(52) U.S. Cl.
CPC .......... *H04W 24/02* (2013.01); *H04B 7/024* (2013.01); *H04W 24/08* (2013.01)

(58) Field of Classification Search
None
See application file for complete search history.

(56) References Cited

U.S. PATENT DOCUMENTS

| RE47,191 E * | 1/2019 | Ma ........................ H04W 16/04 |
| 2011/0134876 A1* | 6/2011 | Takada .............. H04W 72/0406 370/329 |

(Continued)

FOREIGN PATENT DOCUMENTS

| CN | WO 2017/098441 A1 * | 6/2017 | ............ H04W 72/08 |
| EP | 2865209 A1 | 4/2015 | |

(Continued)

*Primary Examiner* — Jeffrey M Rutkowski
*Assistant Examiner* — Ning Li
(74) *Attorney, Agent, or Firm* — Coats & Bennett, PLLC (57) ABSTRACT

Disclosed is a method for improving system performance in a wireless communication network comprising one or more network cells. Each network cell comprises one or more transmission points transmitting cell specific information. The method comprises determining (201, 401) whether a first TRxP comprised in a first network cell fulfills a utilization criterion. When it is determined that the first TRxP fulfills the utilization criterion (202, 401) the method further comprises gathering (204, 403) utilization statistics associated with the first TRxP and/or with the first network cell, evaluating (205, 404) the gathered utilization statistics and determining (206,405), based on the evaluated utilization statistics, whether moving the first TRxP to a second network cell will improve overall system performance of the wireless communication network. Also disclosed are arrangements, transmission points, radio control functions and computer program products.

23 Claims, 3 Drawing Sheets

(56) References Cited

U.S. PATENT DOCUMENTS

| | | | |
|---|---|---|---|
| 2012/0220333 A1 | 8/2012 | Zhu | |
| 2013/0185038 A1* | 7/2013 | Radu | G06F 11/3419 703/2 |
| 2013/0286997 A1 | 10/2013 | Davydov et al. | |
| 2014/0204794 A1 | 7/2014 | El-Najjar et al. | |
| 2014/0269624 A1* | 9/2014 | Khay-Ibbat | H04W 36/30 370/332 |
| 2014/0355454 A1* | 12/2014 | Serban | H04L 41/0631 370/242 |
| 2015/0023209 A1* | 1/2015 | Gunnarsson | H04L 41/0823 370/254 |
| 2015/0163104 A1* | 6/2015 | Coster | H04L 43/08 709/224 |
| 2015/0245233 A1* | 8/2015 | Ko | H04W 24/08 370/252 |
| 2015/0327287 A1 | 11/2015 | Kim et al. | |
| 2016/0105834 A1* | 4/2016 | Gupta | H04W 36/00837 370/332 |
| 2016/0211979 A1* | 7/2016 | Alarcon | H04L 12/185 |
| 2016/0242053 A1* | 8/2016 | Leontiadis | H04W 24/10 |
| 2016/0262114 A1* | 9/2016 | Chen | H04W 52/247 |
| 2016/0269910 A1* | 9/2016 | Lindqvist | H04J 14/02 |
| 2017/0206125 A1* | 7/2017 | Takeshima | G06F 11/0709 |
| 2017/0332335 A1 | 11/2017 | Au et al. | |
| 2018/0077621 A1* | 3/2018 | Harrang | H04W 36/04 |
| 2018/0115401 A1* | 4/2018 | Cedergren | H04L 5/0048 |
| 2018/0132096 A1* | 5/2018 | Huo | H04W 8/08 |
| 2018/0176900 A1* | 6/2018 | Rong | H04W 76/11 |
| 2018/0199163 A1* | 7/2018 | Chen | H04W 72/042 |
| 2018/0242220 A1* | 8/2018 | Venkatraman | H04W 48/02 |
| 2018/0288663 A1* | 10/2018 | Ziren | H04W 36/16 |
| 2018/0288666 A1* | 10/2018 | Fujishiro | H04W 48/12 |
| 2018/0359151 A1* | 12/2018 | Akhavain Mohammadi | H04L 67/303 |
| 2019/0068443 A1* | 2/2019 | Li | H04L 41/0823 |
| 2019/0342802 A1* | 11/2019 | Du | H04W 36/0061 |
| 2020/0314670 A1* | 10/2020 | Van Phan | H04W 36/0069 |

FOREIGN PATENT DOCUMENTS

| | | |
|---|---|---|
| EP | 2865209 B1 | 9/2017 |
| WO | 2016039677 A1 | 3/2016 |
| WO | 2017098441 A1 | 6/2017 |

* cited by examiner

AUTOMATIC TRANSMISSION POINT HANDLING IN A WIRELESS COMMUNICATION NETWORK

TECHNICAL FIELD

The present invention relates generally to the field of wireless communication. More particularly, it relates to enhancing overall system performance in a wireless network.

BACKGROUND

The third generation partnership project (3GPP) is currently working on standardization of the evolved universal mobile telecommunications system terrestrial radio access (E-UTRAN) system, also called LTE (Long Term Evolution), as well as on the evolution of this system into the 5th generation radio access system, also known as New Radio (NR).

LTE is part of the Evolved Packet System (EPS), which also constitutes the Evolved Packet Core (EPC).

The continuously evolving wireless communication systems are typically expected to cover many different use cases and may possibly be operating in many different frequency spectra. With a wide array of applications, frequency bands (i.e. from below 1 GHz to 100 GHz), bandwidths and different modes of operation (e.g. licensed vs. unlicensed), different radio requirements may have to be fulfilled. These radio requirements may typically be subject to regulatory requirements associated with the specific geographical region in which the wireless network is deployed, as well as e.g. to the specific frequency band/sub-band of the network or other parameters.

Moreover, the regulatory constraints, radio frequency planning and device capability typically demand appropriate selection, and adaptation of the user equipment (UE, e.g. a mobile phone) circuitry, which is in turn typically highly important in order to optimize UE performance as well as its power consumption.

For example, multi-antenna technologies typically have a key role in the design of modern Radio Access Technologies (RATs) due to their well-recognized benefits.

Specifically, they enable array gain, spatial multiplexing and spatial diversity (beamforming), which typically leads to improved coverage, capacity, and robustness.

The multi-antenna features have significantly contributed to the success of LTE and will typically continue driving its evolution. Multi-antenna technologies may have an even larger relevance in high frequency bands. For instance, high frequency propagation is subject to several loss factors, starting from the high atmospheric attenuation, rain fade, foliage attenuation, building and wall penetration, diffraction and body/obstruction loss.

While some of the mentioned loss aspects may be considered as minor problems for lower frequency bands, their impact typically becomes severe in the millimetre wave ranges. This increased path-loss limits the potential communications range. However, high frequency bands also allow for smaller frequency reuse distances, larger bandwidth and small beam width which allows for higher gain values, which in turn can to some extent compensate for the experienced higher path-loss, than what is common for low frequency bands.

These factors and restrictions may hence pose several design challenges on the evolving RATs.

In the fifth generation networks (5G) the cell definition has evolved from the fourth generation (4G) definition. A cell in 5G is typically built up by one or several transmission points (TRxP) that broadcasts the same cell specific reference signals (cell identity).

The TRxPs are typically manually configured by the operator in order to be attached to a cell in the network.

However, there exists a need for methods and arrangements that allows for simple and fast reconstruction of the network topology in order to adapt to a changing environment.

SUMMARY

It should be emphasized that the term "comprises/comprising" when used in this specification is taken to specify the presence of stated features, integers, steps, or components, but does not preclude the presence or addition of one or more other features, integers, steps, components, or groups thereof.

It is an object of some embodiments to obviate and/or mitigate at least some of the above disadvantages and to provide methods and arrangements for enhancing overall network performance in wireless communication network.

According to a first aspect, this is achieved by a method for improving system performance in a wireless communication network comprising one or more network cells. Each network cell comprises one or more transmission points (TRxP) transmitting cell specific information. The method comprising determining whether a first TRxP comprised in a first network cell fulfills a utilization criterion.

When it is determined that the first TRxP fulfills the utilization criterion the method further comprises gathering utilization statistics associated with the first TRxP and/or with the first network cell.

The method also comprises evaluating the gathered utilization statistics and determining, based on the evaluated utilization statistics, whether moving the first TRxP to a second network cell will improve overall system performance of the wireless communication network.

When it is determined that moving the first TRxP to the second network cell will improve the overall system performance of the wireless communication network, the method comprises determining whether the second cell fulfils a movement criterion and moving the first TRxP to the second cell of the wireless communication network, when it is determined that the second cell fulfils the movement criterion.

In some embodiments, determining whether the first TRxP comprised in the first network cell fulfils the utilization criterion comprises at least one of determining whether the first TRxP is new to the communication network, determining whether the first TRxP has recently been moved between network cells, determining whether the first TRxP is the only TRxP in the first network cell, determining whether the performance of the first cell is below a performance threshold and determining whether a predetermined time period has expired since the utilization criterion for the first TRxP was last determined.

In some embodiments, the utilization criterion should preferably be determined to be met before any other steps of the method according to some embodiments are carried out.

In some embodiments, gathering utilization statistics associated with the first TRxP and/or with the first network cell comprises at least one of gathering handover statistics for at least the first TRxP, gathering layer 2 and/or layer 3 mobility statistics for at least the first TRxP, gathering resource lending statistics associated with at least the first TRxP, gathering load statistics associated with at least the first TRxP, gathering load statistics associated with the first network cell, gathering load statistics associated with at least one neighbouring network cell and gathering latency statistics associated with at least the first TRxP and the first network cell.

In some embodiments, the method may further comprise determining an optimized cell border layout in order to decrease layer 3 handovers between cells of the wireless communication network and increase layer 2 mobility within cells of the wireless communication network based on the utilization statistics and moving at least the first TRxP according to the determined optimized cell border layout.

In some embodiments, determining whether the second cell fulfils the movement criterion comprises at least one of determining whether a cell size restriction of the second cell permits movement of the first TRxP to the second cell, determining whether the first TRxP is controllable by a network node implementing the second cell, determining whether a processing capacity of the second cell is capable to support an addition of the first TRxP, and determining whether the second cell exists. In some embodiments, when it is determined that the second cell does not exist in the wireless communication network, the method further comprises creating the second cell and associating it with the wireless communication network.

It may e.g. be determined when performing the method according to some embodiments, that moving the TRxP to a certain cell would benefit the overall system performance, but it may be that this cell does not yet exist in the network, and hence needs to be created and preferably associated with a network node.

In some embodiments, when it is determined that the second cell does not fulfil the movement criterion the method comprises keeping the TRxP in the first cell; or evaluating whether at least one third cell is suitable for moving the TRxP to based on utilization statistics for the at least one third cell and if the at least one third cell fulfils the movement criterion.

In some embodiments, when it is determined based on the evaluation of the utilization criterion that the first TRxP is new to the wireless communication network the method further comprises creating a new network cell and associating the TRxP with the new network cell, wherein the new network cell is the first network cell, and wherein the first network cell is served by an existing network node of the wireless network or associating the TRxP to an already existing network cell within the wireless network, wherein the existing network cell is the first network cell and wherein the first network cell is served by an existing network node of the wireless network.

In some embodiments, when it is determined to move the first TRxP from the first network cell to the second network cell, the method further comprises determining whether the first network cell comprises any other TRxPs and deleting, when the first TRxP has been moved, the first network cell when it is determined that it does not comprise any other TRxPs.

In some embodiments, the method may further comprise gathering utilization statistics for at least one second TRxP and/or at least the second cell.

In some embodiments, the at least one second TRxP is associated with the first network cell or with another network cell, and wherein based on the utilization statistics for the at least one second TRxP and/or the another network cell, the method further comprises moving the at least one second TRxP to at least one of the first cell and the another network cell, or creating a new network cell comprising the first TRxP and the at least one second TRxP.

In some embodiments the method is automatically performed for a new or existing TRxP deployed in the wireless communication network by a next generation Node B (gNB), or by a Radio Control Function (RCF) manager located in a network cloud associated with the wireless communication network or by a distributed software function running in a pool of configurable resources, or, by an operation and maintenance node, or by the TRxP itself.

A second aspect is an arrangement for improving system performance in a wireless communication network comprising one or more network cells. Each network cell comprises one or more transmission points (TRxP) transmitting cell specific information. The arrangement comprises controlling circuitry configured to cause determination of whether a first TRxP comprised in a first network cell fulfills a utilization criterion. When it is determined that the first TRxP fulfills the utilization criterion, the controlling circuitry is further configured to cause, gathering of utilization statistics associated with the first TRxP and/or with the first network cell, evaluation of the gathered utilization statistics and determination of, based on the evaluated utilization statistics, whether moving the first TRxP to a second network cell will improve overall system performance of the wireless communication network.

When it is determined that moving the first TRxP to the second network cell will improve the overall system performance of the wireless communication network, the controlling circuitry is further configured to cause determination of whether the second cell fulfils a movement criterion and cause movement of the first TRxP to the second cell of the wireless communication network, when it is determined that the second cell fulfils the movement criterion.

In some embodiments the controlling circuitry is further configured to cause determination of whether the first TRxP fulfils the utilization criterion by being configured to cause at least one of determination of whether the first TRxP is new to the communication network, determination of whether the first TRxP has recently been moved between network cells, determination of whether the first TRxP is the only TRxP in the first network cell, determination of whether the performance of the first cell is below a performance threshold and determination of whether a predetermined time period has expired since the utilization criterion for the first TRxP was last determined.

In some embodiments, the controlling circuitry is further configured to cause the gathering of utilization statistics associated with at least the first TRxP and/or at least the first network cell by being configured to cause at least one of gathering of handover statistics for at least the first TRxP, gathering of layer 2 and/or layer 3 mobility statistics for at least the first TRxP, gathering of resource lending statistics associated with at least the first TRxP, gathering of load statistics associated with at least the first TRxP, gathering of load statistics associated with the first network cell; gathering of load statistics associated with at least one neighbouring network cell, and gathering latency statistics associated with at least the first TRxP and the first network cell.

In some embodiments, the controlling circuitry is further configured to cause determination of an optimized cell border layout for decreasing layer 3 handovers between cells of the wireless communication network and increasing layer 2 mobility within cells of the wireless communication network based on the utilization statistics and movement of at least the first TRxP according to the determined optimized cell border layout.

In some embodiments, the controlling circuitry is further configured to cause determination of whether the second cell fulfils the movement criterion by causing at least one of determination of whether a cell size restriction of the second cell permits movement of the first TRxP to the second cell, determination of whether the first TRxP is controllable by a network node implementing the second cell, determination of whether a processing capacity of the second cell is capable to support an addition of the first TRxP and determination of whether the second cell exists.

In some embodiments, when it is determined that the second cell does not exist in the wireless communication network, the controlling circuitry is further configured to cause creation of the second cell and association of it with the wireless communication network.

In some embodiments, when it is determined that the second cell fulfils the movement criterion the controlling circuitry is further configured to cause keeping of the TRxP in the first cell or causing the evaluation of whether at least one third cell is suitable for moving the TRxP to based on utilization statistics for the at least one third cell and if the at least one third cell fulfils the movement criterion.

In some embodiments, when it is determined based on the evaluation of the utilization criterion that the first TRxP is new to the wireless communication network the controlling circuitry is further configured to cause creation of a new network cell and association of the TRxP with the new network cell, wherein the new network cell is the first network cell, and wherein the first network cell is served by an existing network node of the wireless network or association of the TRxP to an already existing network cell within the wireless network, wherein the existing network cell is the first network cell and wherein the first network cell is served by an existing network node of the wireless network.

In some embodiments, when it is determined to move the first TRxP from the first network cell to the second network cell, the controlling circuitry is further configured to cause determination of whether the first network cell comprises any other TRxPs and deletion of, when the first TRxP has been moved, the first network cell when it is determined that it does not comprise any other TRxPs.

In some embodiments, the controlling circuitry is further configured to cause gathering of utilization statistics for at least one second TRxP and/or at least the second cell.

In some embodiments, the at least one second TRxP is associated with the first network cell or with another network cell, and wherein based on the utilization statistics for the at least one second TRxP and/or the another network cell, the controlling circuitry (is further configured to cause movement of the at least one second TRxP to at least one of the first cell and the another cell, or creation of a new network cell comprising the first TRxP and the at least one second TRxP.

A third aspect is a transmission point (TRxP) deployable in a network cell of a wireless communication network, wherein the network cell is controlled by a radio node, and wherein the TRxP comprises an arrangement according to the second aspect.

A fourth aspect is a radio control function (RCF) manager configured to operate in a wireless communication network cloud and configured to control one or more radio nodes within the network, wherein the RCF manager comprises an arrangement according to the second aspect.

A fifth aspect is a computer program product comprising a non-transitory computer readable medium, wherein the non-transitory computer readable medium has stored there on a computer program comprising program instructions. The computer program is configured to be loadable into a data-processing unit, comprising a processor and a memory associated with or integral to the data-processing unit. When loaded into the data-processing unit, the computer program is configured to be stored in the memory, and wherein the computer program, when loaded into and run by the processor is configured to cause the processor to execute method steps according to the first aspect.

In some embodiments, the second third and fourth aspects may additionally have features identical with or corresponding to any of the various features as explained above for the first aspect.

An advantage of some embodiments is that a wireless communication network is provided which enhances network performance and enables a dynamic and versatile network topology.

Another advantage of some embodiments is networks may easily be adapted to their environments and specific needs in order to always deliver an as good performance as possible.

Another advantage is that complexity within the network is reduced and the risk of dropping service is reduced.

Another advantage is that the disclosed methods and arrangements enable a dynamic topology of a wireless communication network.

Another advantage of some of the embodiments is that less or no manual input is needed to configure the network which reduces cost and complexity when handling the network.

Another advantage of some of the embodiments disclose herein is that less control signaling in the network is needed.

Another advantage of some of the embodiments is that less interruptions in the data transfer occurs which may lead to less risk of dropped connections.

Another advantage is that by constantly evaluating the network performance, either on a centralized or on a distributed level in the network, and rearranging the topology based on the performance it is ensured that the network becomes more reliable and that its resources are utilized in an optimal manner.

BRIEF DESCRIPTION OF THE DRAWINGS

Further objects, features and advantages will appear from the following detailed description of embodiments, with reference being made to the accompanying drawings, in which.

DETAILED DESCRIPTION

In the following, embodiments will be described where a dynamic network topology is enabled by means of automatic transmission point (TRxP) handling in a wireless network.

In wireless communication, development is currently being made with the technology which perhaps may replace or at least support and complement the current technology of LTE and 4G. A new generation is at hand, the fifth generation, 5G.

In 5G, the cell structure has evolved from 4G and a cell is formed by one or more transmission points (TRxPs) which broadcasts the same cell specific information.

It is to be noted that in this disclosure the terms "network cell" and "cell" may be used interchangeably if not otherwise stated.

When a UE moves between different cells it typically relies on inter-cell mobility using Radio Resource Control (RRC) signaling on Layer 3 (L3). However, when moving within a cell, the UE instead typically relies on a faster and more robust Layer 2 (L2) mobility between the different TRxPs forming the cell.

Hence, an abundance of layer 3 handovers in a wireless network may negatively impact the total network performance.

It is to be noted, that in this disclosure, the term overall system performance may be used interchangeably by the term overall network performance, in the same manner the term overall may be used interchangeably with the term total.

Currently a TRxP typically has to be manually/statically configured to belong to a certain cell. To change which cell a TRxP belongs to a manual reconfiguration typically has to be performed. This adds to the maintenance cost of the network provider and the system has no ability to automatically adapt the network to a changing environment (UE population, radio conditions, and e.g. network rollout) to create an optimized cell structure.

Depending on e.g. the 5G radio access network (RAN) deployment, a single TRxP can be configured to different cells. All TRxPs in a specific cell typically share the same scheduler entity (such as e.g. a radio resource scheduler entity) and transmit the same cell specific reference signals. When adding a new TRxP to the system, the operator must currently configure which cell the TRxP is to belong to.

E.g. if two cells are located near each other or even have overlapping coverage areas, a TRxP deployed between the cells, or near the edges of either cell may be configured by the operator to belong to either cell. Depending on which of the cells the TRxP is configured (or attached) to, the overall system performance of the wireless network may vary. This is typically something the operator will have to take into consideration.

Hence, manual interaction by the operator may typically be required when introducing a new TRxP to a network since the TRxP typically only can be configured to a cell manually and since the operator should determine in which cell the TRxP will have the greatest impact on the total network performance. This is a costly procedure, and the task to choose the best configuration is not trivial.

Furthermore, in 5G it is also anticipated that much of the management of the network cells will be located in what is known as the network cloud, where the network cloud forms a centralized environment and the network nodes with their cells forms a distributed environment.

Figure 1:
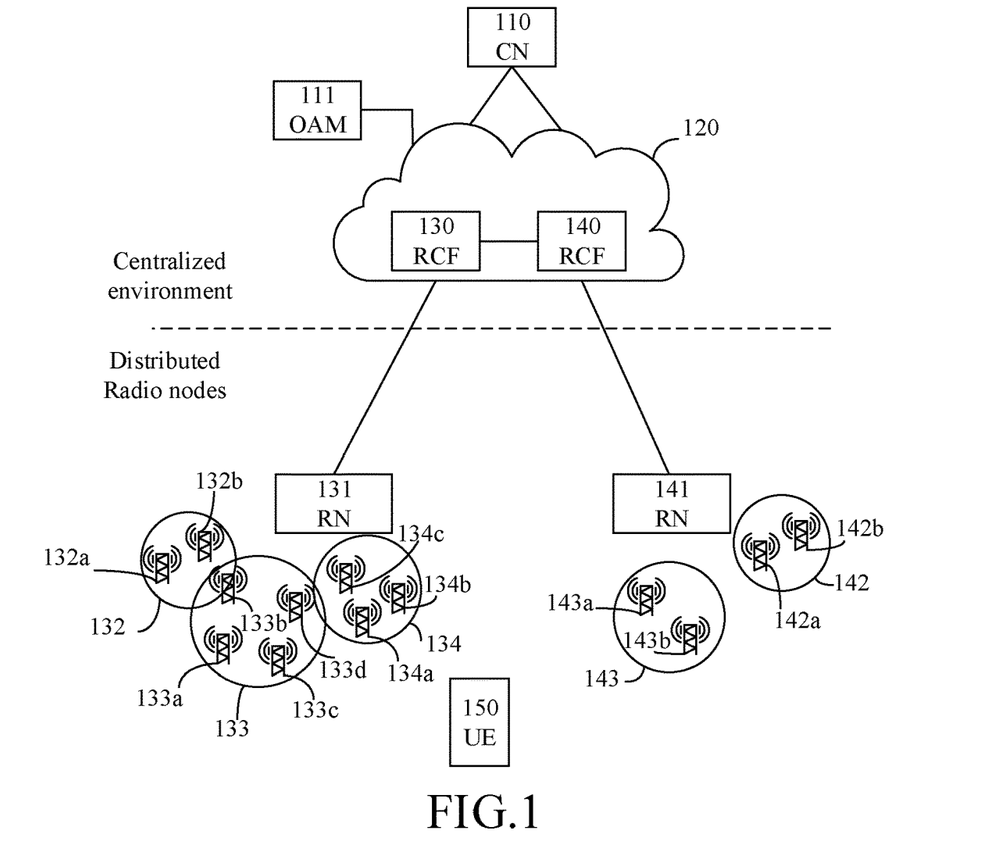
FIG. 1 is a schematic drawing illustrating a network topology according to some embodiments.

FIG. 1 illustrates a typical 5G network topology according to some embodiments.

Illustrated in FIG. 1 is a core network (CN) 110 which is associated with the cloud 120. An operation and maintenance functionality (OAM) 111 is connected to the cloud.

In the cloud 120 are located Radio Control Function (RCF) managers 130, 140. RFC manager 130 and RFC manager 140 control Radio Node (RN) 131 and RN 141 respectively.

RN 131 in turn controls three network cells 132, 133 and 134 which network cells are formed by TRxPs 132a, 132b; 133a, 133b, 133c, 133d; and 134a, 134b, 134c respectively.

In the same manner, RN 141 controls two network cells 142 and 143 which are formed by TRxPs 142a, 142b; and 143a, 143b respectively.

It is to be noted that other network formations are of course possible. The network may e.g. comprise additional, or fewer, radio nodes as well as a greater or smaller number of cells formed by a various number of TRxPs. This illustration is merely to be seen as an example.

A user equipment (UE) 150 may move within the network and connect to the different cells.

One existing problem with current 5G network is that a TRxP typically has to be manually/statically configured to belong to a certain cell (as previously elaborated on). To change which cell a TRxP belongs to a manual reconfiguration typically has to be performed. This adds to the maintenance cost of the network provider and the systems of today have no ability to automatically adapt the network to a changing environment (such as e.g. UE population, radio conditions, network rollout, etc.) to create an optimized cell structure.

Thus there is a need for a method to automatically connect a TRxP to a new or existing cell. The method may also reconnect a TRxP from one cell to another cell, the cells being new to the wireless communication network or already existing within it. The method may comprise basing a decision for movement on e.g. handover statistics, layer 2 mobility statistics, cell load, statistics of TRxP resource lending and/or other relevant metrics.

Figure 2:
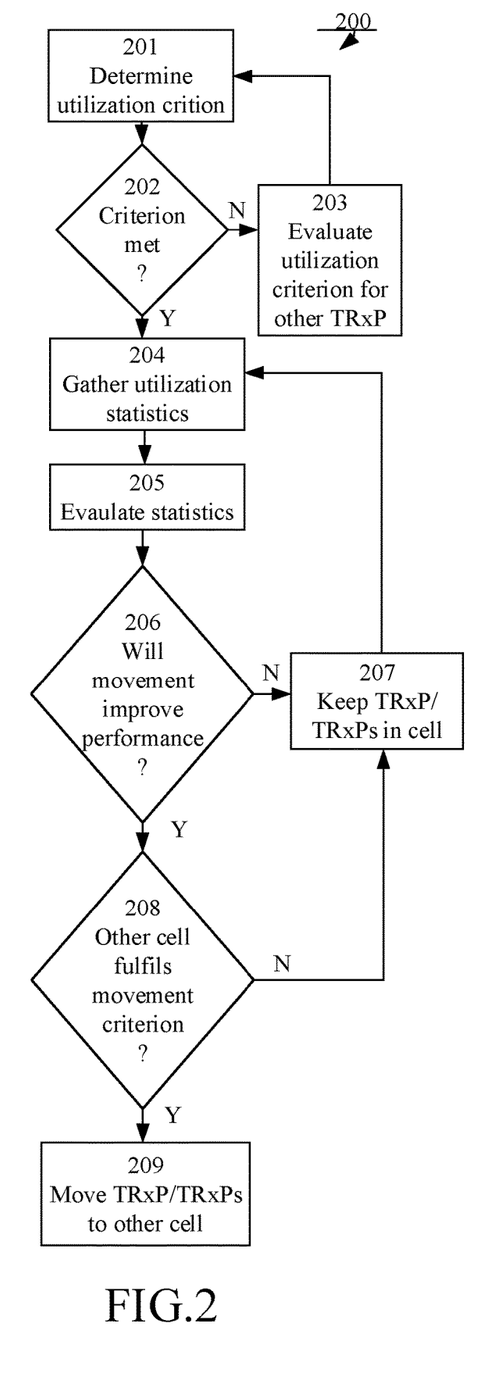
FIG. 2 is a flowchart illustrating example method steps according to some embodiments.

FIG. 2 illustrates such a method according to some embodiments. Method 200 may be a method for improving system performance in a wireless communication network comprising one or more network cells. Each network cell may comprise one or more transmission points (TRxP/TRxPs) transmitting cell specific information.

The wireless communication network may e.g. be the wireless communication network as described in conjunction with FIG. 1.

The method 200 starts in 201 and the step comprises determining whether a first TRxP comprised in a first network cell fulfills a utilization criterion. If the utilization criterion is not fulfilled, the method 200 may not be carried out on the TRxP as will be described further below.

The first TRxP may e.g. be any of the TRxPs described in conjunction with FIG. 1.

The utilization criterion may e.g. be based on one or more different parameters. For example, in some embodiments, determining whether the utilization criterion is met may comprise determining whether the first TRxP is new to the communication network. It may e.g. be that the TRxP has just been deployed in the network by an operator handling the wireless network and has not yet been configured to a cell, or has been configured to any random existing cell in the network.

In some embodiments determining whether the utilization criterion is met may comprise determining whether the first TRxP has recently been moved between network cells. For example, if the TRxP was recently moved that may act as an indication that is was recently evaluated (i.e. the method was recently performed on the TRxP) and that it already is configured to a cell such that best possible network performance is achieved. In some embodiments, determining that the TRxP was recently moved may also indicate that it should be evaluated in order to determine if the move actually did result in better performance, or if the performance still can be improved by moving the TRxP again.

In some embodiments determining whether the utilization criterion is met may comprise determining whether the first TRxP is the only TRxP in the first network cell. This criterion may e.g. indicate that the cell might be superfluous, and could be deleted if the TRxP was moved, or that the cell has great capacity and that the performance of the TRxP will be enhanced if other TRxPs are moved to the cell.

In some embodiments, determining whether the utilization criterion is met may comprise determining whether the performance of the first cell is below a performance threshold. If so, the performance of the cell may inhibit the total performance of the network and an evaluation may thus be needed in order to optimize the topology of the network. The performance threshold may e.g. be based on parameters such as cell and UE throughput, retainability and accessibility, etc.

In some embodiments, determining whether the utilization criterion is met may comprise determining whether a predetermined time period has expired since the utilization criterion for the first TRxP was last determined, or since the method was last carried out for the TRxP. This may e.g. ensure that a TRxP is not allowed to operate for too long without being evaluated in order to ensure that the topology is dynamic and may quickly adapt to the changing needs of the network.

The predetermined time period may e.g. be in the range of minutes, hours, days, weeks etc.

The utilization criterion may also be a combination of one or more of the above mentioned examples.

Returning to the method 200, in step 202 it is determined whether the utilization criterion is met for the first TRxP.

When it is determined that the first TRxP does not meet the utilization criterion (N-path out of 202), the method continues in 203 where another TRxP (e.g. a second TRxP) is evaluated, i.e. the method 200 is carried out for another TRxP in the wireless network (e.g. any of the TRxPs described in FIG. 1).

In some embodiments, when it is determined that the first TRxP does not meet the utilization criterion, the method may stop, and may start again for the same or for another TRxP when a new event is detected in the network (such as e.g. the deployment of a new TRxP or new cell) or when a predetermined period of time has expired.

When it is determined in step 202 that the first TRxP meets the utilization criterion (Y-path out of 202) it is an indication that the method should be further performed on the TRxP, i.e. it should be evaluated for network performance and hence the method 200 continues in 204 with gathering utilization statistics associated with the first TRxP and/or with the first network cell.

Gathering utilization statistics associated with the first TRxP and/or the first network cell may e.g. comprise gathering handover statistics for at least the first TRxP. It may also mean gathering handover statistics for another TRxP and or another cell, e.g. a neighbouring TRxP in the same cell, or a (possibly closely located) TRxP in another cell. Handover statistics may thus be gathered for several TRxPs and cells in the wireless communication network in order to receive an overall image of e.g. handovers performed in the network and between TRxPs and/or cells.

In some embodiments, gathering utilization statistics may comprise gathering layer 2 and/or layer 3 mobility statistics for at least the first TRxP. These statistics give an indication on whether a TRxP more often performs handovers between cells (i.e. layer 3 mobility/handover) or between TRxPs in the same cell (i.e. layer 2 mobility). If the statistics show that layer 3 handovers are common, then it is an indication the TRxP should possibly be moved, possibly leading to that the cell borders might need to be redefined (as will be elaborated on more closely in conjunction with FIG. 5).

In some embodiments, gathering utilization statistics may comprise gathering resource lending statistics associated with at least the first TRxP. In some embodiments, a TRxP configured to one cell may e.g. share its resources with another neighbouring cell without actually being configured by it. However, if it is determined based on the statistics that most of the resources of the TRxP are being used by another cell, it may be more convenient to actually move the TRxP in question to the other cell.

In some embodiments, gathering utilization statistics may comprise gathering load statistics associated with at least the first TRxP. If it e.g. turns out that the TRxP is not at all utilized in the first cell, it may be beneficial to move it to another cell where its capacity may be better utilized. In the same manner it may be determined that the TRxP has a too great load and that the cell would benefit from receiving an additional TRxP which could support the overloaded TRxP.

In some embodiments, gathering utilization statistics may comprise gathering load statistics associated with the first network cell. This may e.g. ensure that an overloaded cell either receives more TRxPs or that the TRxPs within the cell are distributed into other cells in a manner which may enhance the total performance.

In some embodiments, gathering utilization statistics may comprise gathering load statistics associated with at least one neighbouring network cell. Hence an overall view of the network and its performance may be attained.

In some embodiments, gathering utilization statistics may comprise gathering latency statistics associated with at least the first TRxP and the first network cell.

E.g. if there is a high latency associated with the TRxP or the network cell it may be an indication that the TRxP or cell is overloaded which may lead to decreased performance and which may be improved by either moving the TRxP away from the cell, or by adding new TRxPs to the cell.

It is to be noted that gathering utilization statistics may comprise gathering one or more of the parameters as mentioned above. It is also to be noted that described embodiments pertaining to utilization statistics may be gathered for one or more TRxPs or cells in the network when evaluating one TRxP or cell in order to achieve an as complete image of the overall network performance as possible.

Returning to method 200 which then continues in step 205 with evaluating the gathered utilization statistics and in 206 it is determined, based on the evaluated utilization statistics, whether moving the first TRxP to a second network cell will improve overall system performance of the wireless communication network.

The second network cell may e.g. be an already existing cell, or it may be a cell which is to be created for moving the TRxP to.

When evaluating the gathered utilization statistics it may e.g. be determined that the ratio of layer 3 handovers is much higher than the ratio of level 2 mobility for one or more TRxPs (e.g. the first TRxP and a second, third fourth etc.).

The high ratio of layer 3 handover indicate that the TRxPs are of different cells and that network performance could possibly be improved if the TRxPs where to move to the same cell.

In some embodiments, when evaluating the gathered utilization statistics it may be determined that the load statistics of a certain cell (e.g. the first cell) indicates that the cell is over loaded or have troubles meeting service requirements due to high traffic within the cell. In such a case it may improve network performance to either move other TRxPs to the cell, or redistribute the TRxPs that currently attached to the cell to other cells (e.g. the second cell).

In some embodiments, when evaluating the gathered utilization statistics, it may be determined that a new cell (which hence may become the second network cell) should be created which the first TRxP (and possibly other TRxPs) should be moved to.

The second network cell may e.g. be any of the network cells as described in FIG. 1. E.g. in some embodiments, the first cell may be the cell 133 of FIG. 1 and the second cell may be the cell 132 of FIG. 1.

In some embodiments, the term second cell may also mean that e.g. a third, fourth, fifth etc. network cell (either existing or newly created) is also evaluated and may be used for moving the TRxP to.

Hence, it should be noted that instead of moving the first TRxP to the second network cell, it may also be moved to any other cells if moving to any of them would improve the overall network performance.

When in step 206 it is determined that moving the first TRxP to the second network cell will not improve the overall system performance of the wireless communication network (N-path out of 206), the method 200 continues in 207 where the TRxP is kept in its original cell (in this case the first cell) and the method reverts back to 204 where utilization statistics may be gathered for another network cell (e.g. any of the other cells of FIG. 1), or possibly for another TRxP.

When in step 206 it is determined that moving the first TRxP to the second network cell will improve the overall system performance of the wireless communication network (Y-path out of 206), then the method comprises in step 208 determining whether the second cell fulfils a movement criterion.

The movement criterion may e.g. be determined by determining whether a cell size restriction of at least the second cell permits movement of the first TRxP to at least the second cell. It may e.g. be that the second cell has a restriction on how big it may be and that it simply cannot receive any other TRxPs due to it having already reached its limit.

In some embodiments the movement criterion may be determined by determining whether the first TRxP is controllable by a network node implementing (or controlling or being associated with) at least the second cell. It may e.g. be determined whether there exists a communication link between the TRxP and the network node which link fulfils bandwidth and latency requirements.

In some embodiments, determining the movement criterion may comprise determining the overall latency for at least the second cell. For example, if it is determined that the overall latency for at least the second cell (e.g. by measuring the latency ratio from the TRxPs located in the cell to the node implementing the cell) is above (or in some embodiments below) a latency threshold, then it is deemed that the TRxP is not controllable from the second cell.

In some embodiments, determining the movement criterion may comprise determining whether a processing capacity of at least the second cell is capable of supporting an addition of the first TRxP.

In some embodiments, determining the movement criterion may comprise determining whether the second cell exists.

It may e.g. be that the evaluation of the TRxPs and the current network topology reveals that the most optimal alternative is to move the TRxP to a certain cell (e.g. the second cell). However, it may be that this cell does not exist, and hence needs to be created and associated with the network.

Hence, in some embodiments, when it is determined that the second cell does not exist (i.e. is not present) in the wireless communication network, the method may further comprise creating the second cell and associating it with the wireless communication network.

In some embodiments, the method may comprise determining whether there exist any cells that are suitable for moving the TRxP to, and in addition to this also evaluate how the network performance would be affected if an entirely new cell is created for moving the TRxP to (possibly along with other TRxPs).

When it is determined that the best option is to create a new cell, then the method may comprise creating a new cell and move the TRxP to the new cell.

In some embodiments, the method may comprise creating a new cell immediately after (or in some embodiments, prior to) having gathered utilization statistics associated with the TRxP and possibly e.g. the second cell or any other cell in the network.

When it is determined that the second cell does not fulfill the movement criterion (N-path out of 208) it typically means that the second cell cannot receive the first TRxP, and the method 200 continues in 207 where the TRxP is kept in the first cell, while another cell (or TRxP) may be evaluated (step 204) instead.

For example, the method may continue in 204 with evaluating whether at least one third cell is suitable for moving the TRxP to based on utilization statistics for the at least one third cell and further if the at least one third cell fulfils the movement criterion. The third cell may e.g. be cell 134 of FIG. 1. In some embodiments, the method may comprise evaluating several other cells in order to find a cell which moving the TRxP to will result in the best or highest increase of overall network performance.

In some embodiments, when it is determined that the second cell does not fulfill the movement criterion due to it not existing, the method 200 may further comprise creating the second cell in the wireless communication network and moving the first TRxP to the second cell.

Hence the method may also comprise creating new cells in the network in order to further enhance network performance. Thus the method is not restricted to only existing cells, and a dynamic and versatile network topology is achieved.

When in step 208 it is determined that the second cell fulfils the movement criterion (Y-path out of 208) the method continues in 209 where the TRxP is moved to the second cell of the wireless communication network.

The method 200 may be carried out automatically for new or existing TRxPs in a wireless network.

In order to be able to configure a TRxP, it typically has to be attached to a cell such that it is managed by a network node.

Figure 3:
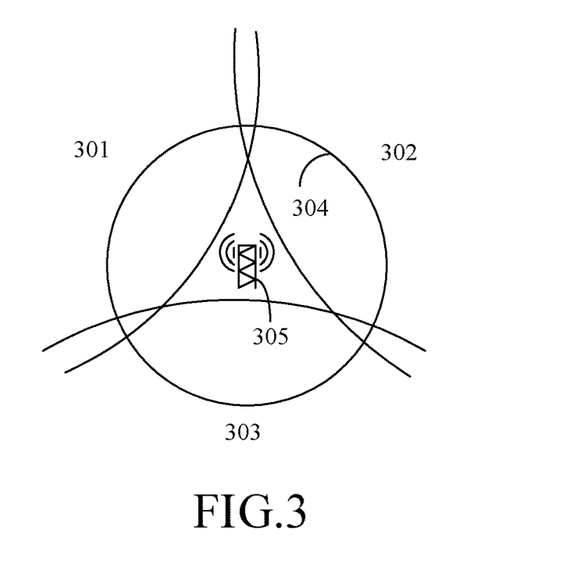
FIG. 3 is a schematic drawing illustrating a network topology according to some embodiments.

FIG. 3 illustrates an example scenario of deployment of a new TRxP 305 in a wireless network. The TRxP 305 has been deployed such that it is close to three other cells, cell 301, 302 and 303. In this scenario, the TRxP 305 has been given its own cell 304 (e.g. the cell 304 may have been created specifically for the TRxP 305). The TRxP 305 and the cells 301, 302, 303 and 304 may e.g. be deployed in the network described in FIG. 1 and they may e.g. be one of the TRxPs or cells described in FIG. 1.

When deploying a new TRxP in a wireless network the new TRxP may be attached (or associated) with an already existing network cell, or a new cell may be created for the new TRxP, which may require some additional steps than described in the method 200.

Figure 4:
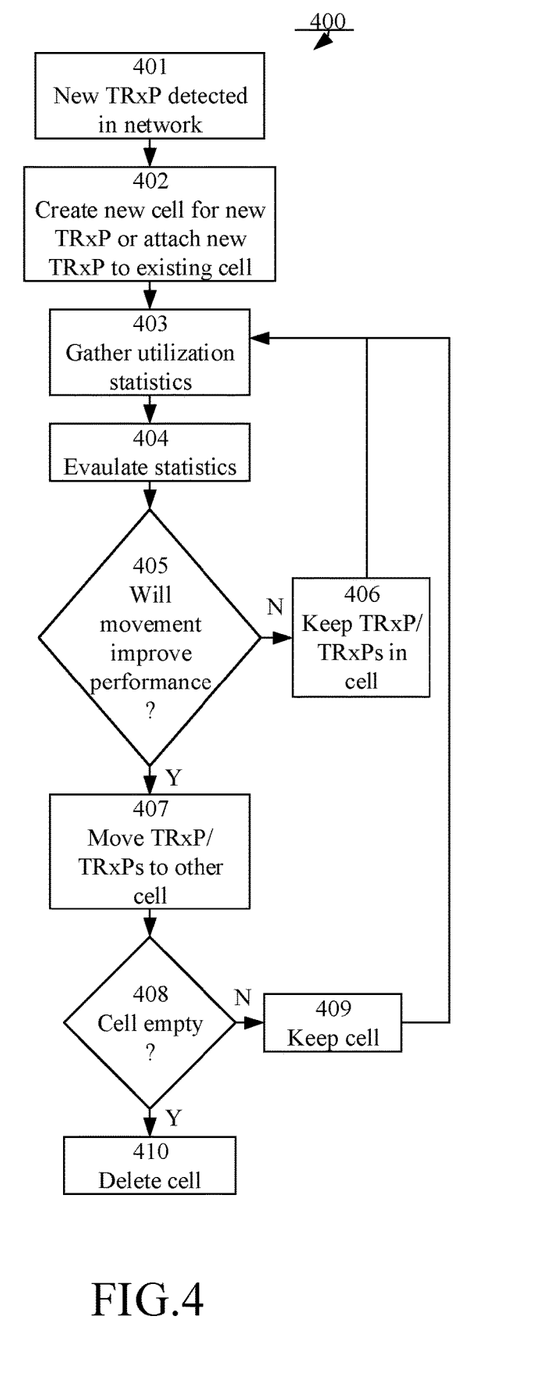
FIG. 4 is a flowchart illustrating example method steps according to some embodiments.

Hence in some embodiments, when deploying a new TRxP into a network, the method 400 described in FIG. 4 may be initiated for the new TRxP.

In some embodiments the method 400 may be integrated into the method 200 described in FIG. 2.

The method 400 may e.g. be initiated in step 201 or step 202 of the method 200 wherein the utilization criterion is evaluated and wherein it is determined whether the TRxP fulfills the utilization criterion.

The method 400 starts in step 401 wherein a new TRxP is detected in the network (e.g. when the method 200 is performed on the new TRxP, it will be determined when evaluating the utilization criterion (step 201-202) that the TRxP is new (step 401)). The TRxP may e.g. have been recently deployed and set up in the wireless network by the operator (the operator may e.g. have installed the TRxP but not performed any configuration to it).

In some embodiments, immediately upon startup of a new TRxP the method 200 and/or 400 may be initiated for the new TRxP and the utilization criterion for the new TRxP may be evaluated (compare with step 201 of FIG. 2).

The evaluation of the utilization criterion may result in the detection of that the TRxP is new (i.e. evaluating the utilization criterion of method 200 resulted in detecting that the TRxP is new to the network) and that it should be configured as soon as possible to a cell in the network.

When it is determined (e.g. based on the evaluation of the utilization criterion compare with method 200) that the first TRxP is new to the wireless communication network the method 400 may further comprise in step 402 creating a new network cell and associating the TRxP with the new network cell, wherein the new network cell is the first network cell (e.g. the first network cell as described in method 200), and wherein the first network cell is served by an existing network node of the wireless network.

In some embodiments, the existing network node may be either a distributed node in the network or a centralized node in the cloud (compare to FIG. 1).

In some embodiments step 402 may, alternatively, instead of creating a new network cell, comprise associating (e.g. attaching) the TRxP to an already existing network cell within the wireless network, wherein the existing network cell is (e.g.) the first network cell and wherein the first network cell is served by an existing network node of the wireless network.

Hence in step 402 of the method 400 a new cell may be created for the new TRxP (compare e.g. with FIG. 3 wherein a new cell 304 has been created for the new TRxP 305), or the new TRxP may be attached to an already existing cell. Thus, according to the method 400 and some embodiments, the new TRxP 305 could have been also attached to an already existing cell in the network, e.g. any of the cells 301, 302 and 303.

The determination of whether a new cell should be created when detecting a new TRxP or if the new TRxP should be attached to an existing cell in the network may be based on various parameters such as geographical location of the TRxP and neighboring cells, performance of neighboring cells, capacity of neighboring cells etc.

It may e.g. not be possible to create a new cell, and the new TRxP may hence be attached to an existing cell which at least appears to be suitable and the methods described herein may then be performed as soon as possible on the new TRxP in order to ensure that the overall network performance is kept as high as possible.

After step 402 of the method 400, the method continues in step 403 where utilizations statistics are gathered (compare with 204 of the method 200) for the TRxP and/or the network cell (in some embodiments, utilization statistics may also be gathered for one or more neighboring TRxPs either in the same or in neighboring network cells and for one or more neighboring network cells, furthermore, the utilization statistics may be the statistics described in conjunction with FIG. 2).

In step 404 the gathered utilization statistics are evaluated (compare with step 205) and in step 405 it is determined based on the gathered and evaluated utilization statistics whether the overall network performance may be enhanced by moving the TRxP to another cell (compare with 206), or in some embodiments, by moving a neighboring TRxP from another cell to the cell comprising the evaluated TRxP.

When it is determined in step 404 that moving the TRxP to another cell will not improve the overall network performance (N-path out of 405) then in step 406 of the method 400, the TRxP is kept in its current network cell (compare with 207) and the method continues in 403 wherein utilization statistics are gathered again e.g. for another cell or TRxP in the wireless network.

If it is determined in step 404 that moving the TRxP to another cell will improve the overall network system performance (Y-path out of 405), the method continues in step 407 where the TRxP is moved to another cell (or in some embodiments, a neighboring TRxP attached to a neighboring cell may be moved to the first cell).

In some embodiments, the steps 403-407 may be the same as steps 204-207 and 209 described in conjunction with FIG. 2. The step 208 of FIG. 2 may also be incorporated in some embodiments into the method 400 to be carried out e.g. between steps 405 and 407.

When moving a TRxP from one cell to another, there is a risk that the cell from which the TRxP was moved becomes empty. E.g. if a new cell is created for a new TRxP this new cell may only comprise the new TRxP and may hence be left empty when either (or both) of the methods 200 and 400 have been carried out for the new TRxP.

In some embodiments, even though the TRxP is not new, there still exists a risk that the old cell becomes empty of TRxPs after a movement.

The method 400 addresses this issue in step 408 wherein when it is determined to move the first TRxP from the first network cell to the second network cell (e.g. in some embodiments after having checked whether the second cell fulfils a movement criterion, compare to method 200 and step 208) the method may further comprise determining whether the first network cell comprises any other TRxPs and deleting in step 410, when the first TRxP has been moved, the first network cell when it is determined that it does not comprise any other TRxPs (Y-path out of step 408).

In some embodiments, when it is determined that the cell is not empty after having moved the TRxP (N-path out of step 408) the method may comprise in step 409 keeping the cell, i.e. not deleting it.

In some embodiments, the steps 408-410 may be incorporated into the method 200, i.e. the method 200 may continue after step 209 with the method steps 408-410 described for the method 400.

In some embodiments, the method 400 as well as the method 200 may further comprise gathering utilization statistics for at least one second TRxP and/or at least the second cell.

The at least one second TRxP may e.g. be any of the TRxPs as described in conjunction with any of the FIGS. 1, 2, 3 and 4 (e.g. TRxP 133*b* described in FIG. 1). In some embodiments, the term the at least one second TRxP may comprise one or more TRxPs (such as e.g. TRxP 133*a*, and 133*c* of FIG. 1).

Hence, when either of the methods 200 or 400 or both is applied, statistics may be gathered for more than one TRxP, i.e. for other TRxPs in the network other than the TRxP the method currently is carried out for (comparing e.g. with FIG. 1, the method may be carried out on the TRxP 132*b*, and utilization statistics may be gathered from TRxPs 132*a* and 133*b*, i.e. cell boundaries does not have to be a restriction when gathering utilization statistics). This results in that the a better overview of the network performance is obtained and also leads to that a more valid decision may be made relating to if and where the TRxP should be moved.

For example, in some embodiments either of the methods 200 and 400 or both may further comprise that the at least one second TRxP is associated with the first network cell or with another network cell.

In some embodiments, the first network cell and the another network cell is the same network cell. In some embodiments, the first network cell may be any of the network cells as described in conjunction with any of the FIGS. 1, 2, 3 and 4, e.g. cell 133 of FIG. 1, and the second network cell may be any of the other cells as described in conjunction with either of FIGS. 1, 2, 3 and 4, such as e.g. the cell 134 or 132 of FIG. 1.

Based on the utilization statistics for the at least one second TRxP and/or the another network cell, the method 200 and/or 400 may further comprise moving the at least one second TRxP to at least one of the first cell and the another network cell, or creating a new network cell comprising the first TRxP and the at least one second TRxP I.e. the first TRxP and the at least one second TRxP may be moved to the new TRxP when it has been created. In some embodiments, possibly only the first or the only the at least one second TRxP is moved to the new cell depending on network performance.

In some embodiments, the method 200 and/or the method 400 may be automatically performed for a new or existing TRxP in the wireless communication network by a next generation Node B (gNB) or by a Radio Control Function (RCF) manager located in a network cloud associated with the wireless communication network or by a distributed software function running in a pool of configurable resources, or by an operation and maintenance node, or by the TRxP itself.

Hence in some embodiments, the method may be performed by a host computer such as RCF or by the core network in a network cloud, e.g. in a 5G environment. This leads to that the method is controlled in the centralized area (compare with FIG. 1) and a detailed overview of the total network performance may be achieved.

The method may be carried out continuously, but it may also be carried out non-continuously in some embodiments. The method may e.g. be triggered by certain events in the network, such as the addition of a new TRxP, addition of new cell, removal of a cell, removal of a TRxP, etc.

Furthermore, a TRxP which has been newly deployed in the network may signal to e.g. its associated network node that it has been added.

In some embodiments, the method is carried out by the TRxP itself. However, this may result that only a local estimation of the network performance is achieved. This may however be beneficial for some applications, e.g. if it is important that a certain area always have a good performance and that it is more important to ensure that this area is not congested than ensuring that the whole network operates well.

In some embodiments, the method 200 and/or 400 may be carried out manually by an operator when installing the TRxP.

In some embodiments, the method 200 and/or 400 may require manual interaction in order to proceed with moving the TRxP/TRxPs to another cell in the network. E.g. an operator may be notified of possible movements that may be beneficial for the overall network performance, and may thus decide which or any of the suggested movements should be carried out.

This may again be based on e.g. the topology of the network or what needs the network should fulfil.

It may e.g. be more beneficial if one or more network cells or TRxPs which covers a roadway (such as e.g. a well trafficated high way or any other well trafficated roadway) and are part of a large network are able to deliver better service than a part of the network comprising cells or TRxPs which covers e.g. a field.

Hence, in some embodiments, either or both of the methods 200 and 400 may further comprise determining an optimized cell border layout (in order to enhance the total network performance e.g.) by decreasing layer 3 handovers between cells of the wireless communication network and increasing layer 2 mobility within cells of the wireless communication network. This determination may be based on the utilization statistics, and the methods may further comprise moving at least the first TRxP according to the determined optimized cell border layout.

Reducing the number of layer 3 handovers in a network reduces the complexity and hence frees capacity which may be used for other services and thus results in a better total performance of the network.

Figure 5A:
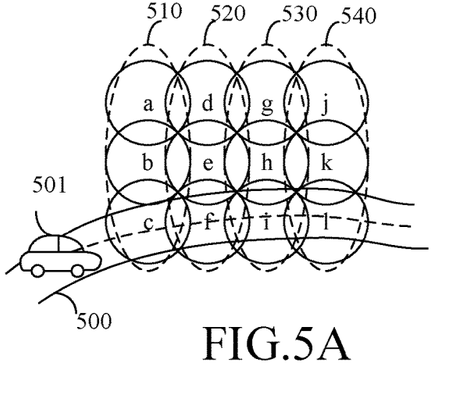
FIGS. 5A and 5B are schematic drawings illustrating a network topology scenario according to some embodiments.
Figure 5B:
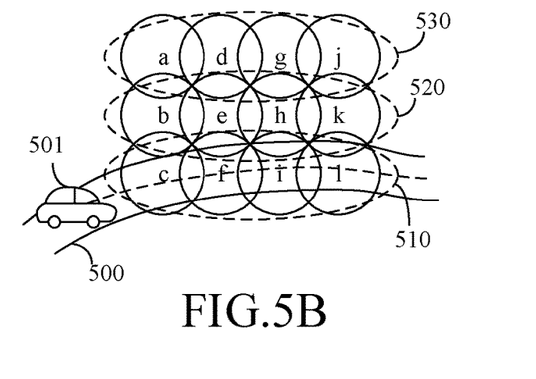

An example of this is illustrated in FIGS. 5A and 5B according to some embodiments.

FIGS. 5A and 5B both illustrates a roadway 500 and an approaching car 501. The approaching car 501 may e.g. carry a passenger with an UE requesting service.

In FIG. 5A the roadway is covered by network cells 510, 520, 530 and 540.

The cell 520 comprises TRxPs a, b and c each covering a small area of the cell. In the same manner the cell 520 comprises TRxPs d, e, and f, the cell 530 comprises TRxPs g, h and i, and the cell 540 comprises the TRxPs j, k and l.

This topology would mean that the UE traveling in car 501 on the roadway 500 would pass the coverage area of 4 different TRxPs (c, f, i, and l) pertaining to 4 different cells (510, 520, 530 and 540). Hence 4 intercell Layer 3 mobility handovers needs to be performed. This introduces unnecessary complexity to the network.

When e.g. the method 200 and/or 400 is carried out on either of the TRxPs c, f, i and l it may be noted when utilization statistics pertaining to e.g. handovers are gathered (compare with steps 204-205 and 403-404 of the methods 200 and 400) that a large of amount of Layer 3 handovers are performed in the area.

When this is evaluated it may be determined that by rearranging the cell borders (e.g. by moving the TRxPs around between cells), the overall network performance may be enhanced by reducing the number of layer 3 hand overs.

As shown in FIG. 5B cell borders may be rearranged in order to reduce handovers utilizing inter cell mobility using Layer 3 protocols.

For example, it may be determined that moving the TRxPs f, i and l to the cell 510 (i.e. configuring the TRxPs to the network node (not shown) of cell 510, compare with FIG. 1) will rearrange the cell border of the cell 510 such that it covers the roadway 500. Thus, the UE travelling in the car 501 will be subjected to layer 2 mobility between the TRxPs c, f, i and l but will not be handed over to another cell.

Since there may be size restriction on the cell 510, it may be necessary to move the TRxPs a and b from the cell 510 to one or more of the other cells 520, 530 and 540.

As exemplified in FIG. 5B the TRxPs b, h and k has been moved to cell 520 and the TRxPs a, d and j has been moved to the cell 530.

This particular network topology has resulted in that the cell 540 of FIG. 5A which comprised TRxPs j, k and l has become obsolete and hence deleted from the network in FIG. 5B (compare with steps 408 and 410 of the method 400).

It is to be noted that the scenario illustrated by FIGS. 5A and 5B is just an example and that networks comprising either a greater number or a fewer number of cells as well as either a greater number or a fewer number of TRxPs are of course possible as well as different appearances of the cell borders.

What is significant is that the methods disclosed herein enables automatic and quick adaptation of the network topology in order to better suit the needs of the network and hence improving the total network system performance.

The method disclosed herein may e.g. be implemented in a new radio (NR) network and/or a 5G network.

Figure 6:
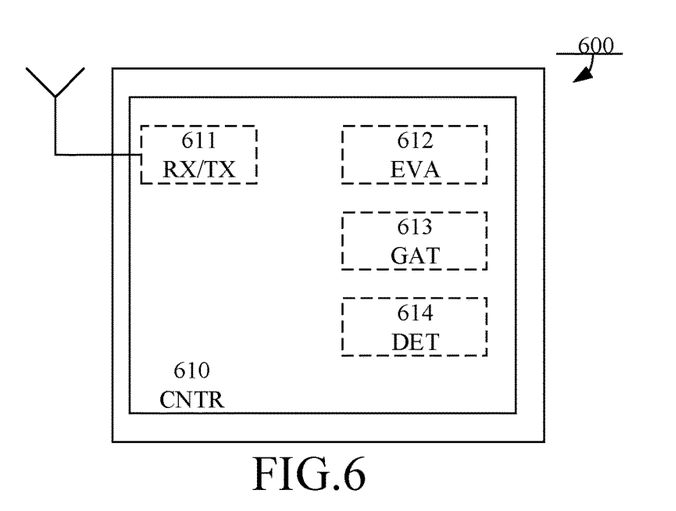
FIG. 6 is a block diagram illustrating an example arrangement according to some embodiments.

FIG. 6 illustrates an example arrangement 600 according to some embodiments.

The arrangement 600 may in some embodiments optionally comprise a controlling circuitry (CNTR) 610.

In some embodiments, the controlling circuitry may comprise a transceiver 611.

In some embodiments, the transceiver 611 comprises a separate transmitter and a separate receiver.

In some embodiments, the transceiver 611 comprises a multiple input, multiple output (MIMO) antenna arrangement. In some embodiments, the transceiver 611 comprises an advanced antenna system (AAS) antenna arrangement.

Furthermore, in some embodiments, and as illustrated in FIG. 6, the controlling circuitry 610 may further optionally comprise an evaluator (EVA, e.g. evaluating circuitry) 612, a gatherer (GAT e.g. circuitry for gathering information) 613 and a determiner (DET e.g. circuitry for making determinations based on gathered and evaluated data) 614.

In some embodiments the transceiver 611, evaluator 612, gatherer 613 and determiner 614 are not comprised within the controlling circuitry 610 but are instead associated with the controlling circuitry.

The arrangement 600 may be for improving system performance in a wireless communication network comprising one or more network cells, wherein each network cell comprises one or more transmission points (TRxP) transmitting cell specific information.

The wireless communication network may e.g. be any of the networks as described in conjunction with any of the FIGS. 1-5. The network cells may e.g. be any of the network cells as described in conjunction with any of the FIGS. 1-5 and the TRxPs may e.g. be any of the TRxPs as described in conjunction with any of the FIGS. 1-5.

In some embodiments, the arrangement 600 may comprise controlling circuitry (CNTR) 610 configured to cause determination of whether a first TRxP comprised in a first network cell fulfills a utilization criterion, wherein when it is determined that the first TRxP fulfills the utilization criterion, the controlling circuitry is further configured to cause gathering of utilization statistics associated with the first TRxP and/or with the first network cell.

The controlling circuitry 610 may further be configured to cause evaluation of the gathered utilization statistics and determination of, based on the evaluated utilization statistics, whether moving the first TRxP to a second network cell will improve overall system performance of the wireless communication network.

When it is determined by the controlling circuitry 610 that moving the first TRxP to the second network cell will improve the overall system performance of the wireless communication network, the controlling circuitry 610 may further be configured to cause determination of whether the second cell fulfils a movement criterion, and cause movement of the first TRxP to the second cell of the wireless communication network, when it is determined that the second cell fulfils the movement criterion.

The arrangement 610 may hence in some embodiments be configured to cause the execution of the methods 200 and/or 400.

The controlling circuitry 610 may in some embodiments further be configured to cause the determiner 614 to determine whether a first TRxP comprised in a first network cell fulfills a utilization criterion.

The controlling circuitry 620 may also when it is determined that the first TRxP fulfills the utilization criterion, the controlling circuitry is further configured to cause be configured to cause the gatherer 613 to gather utilization statistics associated with at least the first TRxP and/or at least the first network cell.

The controlling circuitry 610 may also be configured to cause the evaluator 612 to evaluate the gathered utilization statistics.

The controlling circuitry 610 may also be configured to cause the determiner 614 to determine based on the evaluated utilization statistics if moving the first TRxP to a second network cell will improve overall system performance of the wireless communication network.

Furthermore, the controlling circuitry 610 may also be configured to, if it is determined that moving the first TRxP to the second network cell will improve the overall system performance of the wireless communication network, cause the movement of the first TRxP to a second cell in the wireless communication network.

In some embodiments, the controlling circuitry may be configured to cause the determination (e.g. by causing the determiner 614) of whether the first TRxP fulfils the utilization criterion by being configured to cause at least one of: determination of whether the first TRxP is new to the communication network; determination of whether the first TRxP has recently been moved between network cells; determination of whether the first TRxP is the only TRxP in the first network cell; determination of whether the performance of the first cell is below a performance threshold; and determination of whether a predetermined time period has expired since the utilization criterion for the first TRxP was last evaluated.

In some embodiments, the different parameters for determining the utilization criterion may be the same parameters for determining the utilization criterion as described in conjunction with FIG. 2.

In some embodiments, the the controlling circuitry 610 is further configured to cause the gathering of utilization statistics (e.g. by causing the gatherer 613) associated with at least the first TRxP and/or at least the first network cell by being configured to cause at least one of: gathering of handover statistics for at least the first TRxP, gathering of layer 2 and/or layer 3 mobility statistics for at least the first TRxP, gathering of resource lending statistics associated with at least the first TRxP, gathering of load statistics associated with at least the first TRxP, gathering of load statistics associated with the first network cell, gathering of load statistics associated with at least one neighbouring network cell, and gathering latency statistics associated with at least the first TRxP and the first network cell (compare with the method 200 and 400 and FIG. 5).

In some embodiments, the different parameters pertaining to gathering the utilization statistics may be the same parameters for gathering the utilization statistics as described in conjunction with FIG. 2.

In some embodiments, the controlling circuitry 610 may be further configured to cause determination of an optimized cell border layout for decreasing layer 3 handovers between cells of the wireless communication network and increasing layer 2 mobility within cells of the wireless communication network based on the utilization statistics, and movement of at least the first TRxP according to the determined optimized cell border layout (compare with FIGS. 5A and 5B).

In some embodiments, when it is determined that the second cell fulfils the movement criterion the controlling circuitry 610 may be further configured to cause: keeping of the TRxP in the first cell; or causing the evaluation of whether at least one third cell is suitable for moving the TRxP to based on utilization statistics for the at least one third cell (e.g. by causing the evaluator 612 to evaluate another cell, compare with the methods 200 and 400) and causing the determination of whether the at least one third cell fulfils the movement criterion (e.g. by causing the determiner 614).

In some embodiments, determining whether the second cell (or third or any other cell) fulfils the movement criterion may comprise causing by the controlling circuitry 610 at least one of (e.g. by causing the determiner 614): determination of whether a cell size restriction of the second cell permits movement of the first TRxP to the second cell, determination of whether the first TRxP is controllable by a network node implementing the second cell, determination of whether a processing capacity of the second cell is capable to support an addition of the first TRxP (compare with e.g. any of the FIGS. 1-5) and determination of whether the second cell exists.

In some embodiments, when it is determined that the second cell does not exist in the wireless communication network, the controlling circuitry 610 may be further configured to cause creation of the second cell and association of it with the wireless communication network.

In some embodiments, when it is determined based on the evaluation of the utilization criterion that the first TRxP is new to the wireless communication network the controlling circuitry 610 may be further configured to cause: creation of a new network cell and association of the TRxP with the new network cell, wherein the new network cell is the first network cell, and wherein the first network cell is served by an existing network node of the wireless network, or association of the TRxP to an already existing network cell within the wireless network, wherein the existing network cell is the first network cell and wherein the first network cell is served by an existing network node of the wireless network.

In some embodiments, when it is determined to move the first TRxP from the first network cell to the second network cell, the controlling circuitry 610 may further be configured to cause: determination of whether the first network cell comprises any other TRxPs, and deletion of, when the first TRxP has been moved, the first network cell when it is determined that it does not comprise any other TRxPs.

In some embodiments, the controlling circuitry 610 may further be configured to cause gathering of utilization statistics for at least one second TRxP and/or at least the second cell (e.g. by causing the gatherer 613 to gather utilization statistics for another cell and/or TRxP).

In some embodiments, the at least one second TRxP may associated with the first network cell or with another network cell, and based on the utilization statistics for the at least one second TRxP and/or the another network cell, the controlling circuitry 610 may be further configured to cause: movement of the at least one second TRxP to at least one of the first cell and the another cell, or creation of a new network cell comprising the first TRxP and the at least one second TRxP.

In some embodiments, the arrangement 600 as described above may be comprised within a transmission point (TRxP) deployable in a network cell of a wireless communication network, wherein the network cell is controlled by a radio node. The transmission point comprising the arrangement 600 may e.g. be any of the transmission points as described in conjunction with any of the FIGS. 1-5.

In some embodiments, the arrangement 600 may be comprised in a radio control function (RCF) manager configured to operate in a wireless communication network cloud and configured to control one or more radio nodes within the network.

The RCF manager may e.g. be the RCF manager as described in conjunction with FIG. 1.

Figure 7:
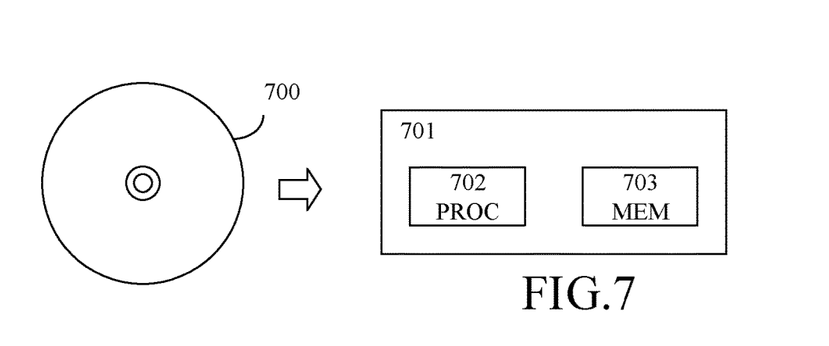
FIG. 7 is a schematic drawing illustrating a computer program product according to some embodiments.

FIG. 7 illustrates a computer program product comprising a non-transitory computer readable medium 700, wherein the non-transitory computer readable medium 700 has stored there on a computer program comprising program instructions.

The computer program is configured to be loadable into a data-processing unit 701 comprising a processor (PROC) 702 and a memory (MEM) 703 associated with or integral to the data-processing unit 701.

When loaded into the data-processing unit 701, the computer program 700 is configured to be stored in the memory 703.

The computer program 700, when loaded into and run by the processor 702, is configured to cause the processor 702 to execute method steps according to any method 200 and/or 400.

Methods and arrangements are disclosed herein that enables a dynamic topology of a wireless communication network.

An advantage of some of the embodiments is that less or no manual input is needed to configure the network which reduces cost and complexity when handling the network.

Another advantage of some of the embodiments disclose herein is that less control signaling in the network is needed.

Another advantage of some of the embodiments is that less interruptions in the data transfer occurs which may lead to less risk of dropped connections.

By constantly evaluating the network performance, either on a centralized or on a distributed level in the network and rearranging the topology based on the performance it is ensured that the network becomes more reliable and that its resources are utilized in an optimal manner.

The described embodiments and their equivalents may be realized in software or hardware or a combination thereof. They may be performed by general-purpose circuits associated with or integral to a communication device, such as digital signal processors (DSP), central processing units (CPU), co-processor units, field-programmable gate arrays (FPGA) or other programmable hardware, or by specialized circuits such as for example application-specific integrated circuits (ASIC). All such forms are contemplated to be within the scope of this disclosure.

Embodiments may appear within an electronic apparatus (such as a wireless communication device) comprising circuitry/logic or performing methods according to any of the embodiments. The electronic apparatus may, for example, be a portable or handheld mobile radio communication equipment, a mobile radio terminal, a mobile telephone, a base station, a base station controller, a pager, a communicator, an electronic organizer, a smartphone, a computer, a notebook, a USB-stick, a plug-in card, an embedded drive, or a mobile gaming device.

According to some embodiments, a computer program product comprises a computer readable medium such as, for example, a diskette or a CD-ROM. The computer readable medium may have stored there on a computer program comprising program instructions. The computer program may be loadable into a data-processing unit, which may, for example, be comprised in a mobile terminal. When loaded into the data-processing unit, the computer program may be stored in a memory associated with or integral to the data-processing unit. According to some embodiments, the computer program may, when loaded into and run by the data-processing unit, cause the data-processing unit to execute method steps according to, for example, the methods shown in any of the FIGS. 2 and 4.

Reference has been made herein to various embodiments. However, a person skilled in the art would recognize numerous variations to the described embodiments that would still fall within the scope of the claims. For example, the method embodiments described herein describes example methods through method steps being performed in a certain order. However, it is recognized that these sequences of events may take place in another order without departing from the scope of the claims. Furthermore, some method steps may be performed in parallel even though they have been described as being performed in sequence.

In the same manner, it should be noted that in the description of embodiments, the partition of functional blocks into particular units is by no means limiting. Contrarily, these partitions are merely examples. Functional blocks described herein as one unit may be split into two or more units. In the same manner, functional blocks that are described herein as being implemented as two or more units may be implemented as a single unit without departing from the scope of the claims.

Hence, it should be understood that the details of the described embodiments are merely for illustrative purpose and by no means limiting. Instead, all variations that fall within the range of the claims are intended to be embraced therein.

The invention claimed is:

1. A method for improving system performance in a wireless communication network, the wireless communication network comprising one or more network cells, wherein each network cell comprises one or more transmission points (TRxP) transmitting cell specific information, the method comprising:
   determining whether a first TRxP comprised in a first network cell fulfills a utilization criterion;
   in response to determining that the first TRxP fulfills the utilization criterion:
      gathering utilization statistics associated with the first TRxP and/or with the first network cell, the utilization statistics comprising layer 2 and layer 3 mobility statistics for at least the first TRxP;
      evaluating the gathered utilization statistics;
      determining, based on the evaluated utilization statistics, whether moving the first TRxP to a second network cell will improve overall system performance of the wireless communication network; and
   in response to determining that moving the first TRxP to the second network cell will improve the overall system performance of the wireless communication network:
      determining whether the second network cell fulfils a movement criterion; and
      moving the first TRxP to the second network cell of the wireless communication network in response to determining that the second network cell fulfils the movement criterion.

2. The method of claim 1, wherein the determining whether the first TRxP comprised in the first network cell fulfils the utilization criterion comprises:
   determining whether the first TRxP is new to the communication network;
   determining whether the first TRxP has recently been moved between network cells;
   determining whether the first TRxP is the only TRxP in the first network cell;
   determining whether the performance of the first network cell is below a performance threshold; and/or
   determining whether a predetermined time period has expired since the utilization criterion for the first TRxP was last determined.

3. The method of claim 2, further comprising, in response to determining, based on the evaluation of the utilization criterion, that the first TRxP is new to the wireless communication network:
   creating a new network cell and associating the first TRxP with the new network cell, wherein the new network cell is the first network cell, and wherein the first network cell is served by an existing network node of the wireless network; or
   associating the first TRxP to an already existing network cell within the wireless network, wherein the existing network cell is the first network cell, and wherein the first network cell is served by an existing network node of the wireless network.

4. The method of claim 1, wherein the gathering utilization statistics comprises:
   gathering handover statistics for at least the first TRxP;
   gathering resource lending statistics associated with at least the first TRxP;
   gathering load statistics associated with at least the first TRxP;
   gathering load statistics associated with the first network cell;

gathering load statistics associated with at least one neighboring network cell; and/or gathering latency statistics associated with at least the first TRxP and the first network cell.

5. The method of claim 1, further comprising:

determining an optimized cell border layout in order to decrease layer 3 handovers between cells of the wireless communication network and increase layer 2 mobility within cells of the wireless communication network based on the utilization statistics; and moving at least the first TRxP according to the determined optimized cell border layout.

6. The method of claim 5, wherein the determining whether the second network cell fulfils the movement criterion comprises:

determining whether a cell size restriction of the second network cell permits movement of the first TRxP to the second network cell;

determining whether the first TRxP is controllable by a network node implementing the second network cell;

determining whether a processing capacity of the second network cell is capable to support an addition of the first TRxP; and/or determining whether the second network cell exists.

7. The method of claim 6, further comprising, in response to determining that the second network cell does not exist in the wireless communication network, creating the second network cell and associating it with the wireless communication network.

8. The method of claim 6, further comprising, in response to determining that the second network cell does not fulfil the movement criterion:

keeping the first TRxP in the first network cell; or evaluating whether at least one third cell is suitable for moving the first TRxP to based on utilization statistics for the at least one third cell and whether the at least one third cell fulfils the movement criterion.

9. The method of claim 1, further comprising, in response to determining to move the first TRxP from the first network cell to the second network cell:

determining whether the first network cell comprises any other TRxPs; and deleting, when the first TRxP has been moved, the first network cell when it is determined that it does not comprise any other TRxPs.

10. The method of claim 1, further comprising gathering utilization statistics for at least one second TRxP and/or at least the second network cell.

11. The method of claim 10:

wherein the at least one second TRxP is associated with the first network cell or with another network cell;

further comprising, based on the utilization statistics for the at least one second TRxP and/or the another network cell:

moving the at least one second TRxP to the first network cell and/or the another network cell; or creating a new network cell comprising the first TRxP and the at least one second TRxP.

12. An arrangement for improving system performance in a wireless communication network, the wireless communication network comprising one or more network cells, wherein each network cell comprises one or more transmission points (TRxP) transmitting cell specific information, the arrangement comprising:

processing circuitry;

memory containing instructions executable by the processing circuitry whereby the arrangement is operated to:

determine whether a first TRxP comprised in a first network cell fulfills a utilization criterion;

in response to determining that the first TRxP fulfills the utilization criterion, causing:

gathering of utilization statistics associated with the first TRxP and/or with the first network cell, the utilization statistics comprising layer 2 and layer 3 mobility statistics for at least the first TRxP;

evaluation of the gathered utilization statistics;

determination of, based on the evaluated utilization statistics, whether moving the first TRxP to a second network cell will improve overall system performance of the wireless communication network; and in response to determining that moving the first TRxP to the second network cell will improve the overall system performance of the wireless communication network, causing:

determination of whether the second network cell fulfils a movement criterion; and movement of the first TRxP to the second network cell of the wireless communication network in response to determining that the second network cell fulfils the movement criterion.

13. The arrangement of claim 12, wherein the instructions are such that the arrangement is operated to cause determination of whether the first TRxP fulfils the utilization criterion by causing:

determination of whether the first TRxP is new to the communication network;

determination of whether the first TRxP has recently been moved between network cells;

determination of whether the first TRxP is the only TRxP in the first network cell;

determination of whether the performance of the first network cell is below a performance threshold; and/or determination of whether a predetermined time period has expired since the utilization criterion for the first TRxP was last determined.

14. The arrangement of claim 13, wherein the instructions are such that the arrangement is operated to cause, in response to a determination that the first TRxP is new to the wireless communication network:

creation of a new network cell and association of the first TRxP with the new network cell, wherein the new network cell is the first network cell, and wherein the first network cell is served by an existing network node of the wireless network; or association of the first TRxP to an already existing network cell within the wireless network, wherein the existing network cell is the first network cell, and wherein the first network cell is served by an existing network node of the wireless network.

15. The arrangement of claim 12, wherein the instructions are such that the arrangement is operated to cause the gathering of utilization statistics by causing:

gathering of handover statistics for at least the first TRxP;

gathering of resource lending statistics associated with at least the first TRxP;

gathering of load statistics associated with at least the first TRxP;

gathering of load statistics associated with the first network cell;

gathering of load statistics associated with at least one neighboring network cell; and/or gathering latency statistics associated with at least the first TRxP and the first network cell.

16. The arrangement of claim 12, wherein the instructions are such that the arrangement is operated to cause:

determination of an optimized cell border layout for decreasing layer 3 handovers between cells of the wireless communication network and increasing layer 2 mobility within cells of the wireless communication network based on the utilization statistics; and movement of at least the first TRxP according to the determined optimized cell border layout.

17. The arrangement of claim 12, wherein the instructions are such that the arrangement is operated to cause determination of whether the second network cell fulfils the movement criterion by causing:

determination of whether a cell size restriction of the second network cell permits movement of the first TRxP to the second network cell;

determination of whether the first TRxP is controllable by a network node implementing the second network cell;

determination of whether a processing capacity of the second network cell is capable to support an addition of the first TRxP; and/or determination of whether the second network cell exists.

18. The arrangement of claim 17, wherein the instructions are such that the arrangement is operated to cause, in response to a determination that the second network cell does not exist in the wireless communication network, creation of the second network cell and association of it with the wireless communication network.

19. The arrangement of claim 17, wherein the instructions are such that the arrangement is operated to cause, in response to a determination that the second network cell does not fulfil the movement criterion:

keeping of the first TRxP in the first network cell; or evaluation of whether at least one third cell is suitable for moving the first TRxP to based on utilization statistics for the at least one third cell and whether the at least one third cell fulfils the movement criterion.

20. The arrangement of claim 12, wherein the instructions are such that the arrangement is operated to cause, in response to a determination to move the first TRxP from the first network cell to the second network cell:

determination of whether the first network cell comprises any other TRxPs; and deletion of, when the first TRxP has been moved, the first network cell when it is determined that it does not comprise any other TRxPs.

21. The arrangement of claim 12, wherein the instructions are such that the arrangement is operated to cause gathering of utilization statistics for at least one second TRxP and/or at least the second network cell.

22. The arrangement of claim 21:

wherein the at least one second TRxP is associated with the first network cell or with another network cell;

wherein the instructions are such that the arrangement is operated to cause, based on the utilization statistics for the at least one second TRxP and/or the another network cell:

movement of the at least one second TRxP to the first network cell and/or the another cell; or creation of a new network cell comprising the first TRxP and the at least one second TRxP.

23. A transmission point (TRxP) to be deployed in a network cell of a wireless communication network; the wireless communication network comprising one or more network cells, wherein each network cell comprises one or more transmission points transmitting cell specific information; wherein the network cell is controlled by a radio node; the TRxP comprising:

an arrangement for improving system performance, the arrangement comprising processing circuitry and memory containing instructions executable by the processing circuitry whereby the arrangement is operated to:

determine whether a first TRxP comprised in a first network cell fulfills a utilization criterion;

in response to determining that the first TRxP fulfills the utilization criterion, causing:

gathering of utilization statistics associated with the first TRxP and/or with the first network cell, the utilization statistics comprising layer 2 and layer 3 mobility statistics for at least the first TRxP;

evaluation of the gathered utilization statistics;

determination of, based on the evaluated utilization statistics, whether moving the first TRxP to a second network cell will improve overall system performance of the wireless communication network; and in response to determining that moving the first TRxP to the second network cell will improve the overall system performance of the wireless communication network, causing:

determination of whether the second network cell fulfils a movement criterion; and movement of the first TRxP to the second network cell of the wireless communication network in response to determining that the second network cell fulfils the movement criterion.

* * * * *